Aug. 29, 1939.  R. L. NEILL  2,170,868
CONTROL OF MOTOR VEHICLE CLUTCHES
Filed Feb. 2, 1935   2 Sheets-Sheet 1

INVENTOR
ROBERT LESLIE NEILL
BY
H. O. Clayton
ATTORNEY

Aug. 29, 1939.   R. L. NEILL   2,170,868
CONTROL OF MOTOR VEHICLE CLUTCHES
Filed Feb. 2, 1935   2 Sheets-Sheet 2

INVENTOR.
ROBERT LESLIE NEILL
BY
ATTORNEY.

Patented Aug. 29, 1939

2,170,868

UNITED STATES PATENT OFFICE 2,170,868

CONTROL OF MOTOR VEHICLE CLUTCHES

Robert Leslie Neill, Birmingham, England, assignor to Bendix Aviation Corporation, Chicago, Ill., a corporation of Delaware Application February 2, 1935, Serial No. 4,705
In Great Britain February 2, 1934

1 Claim. (Cl. 192—.01)

This invention relates to motor vehicle clutches of the kind in which the clutch for connecting the engine to the gear box can be placed under the control of fluid pressure, and more particularly, in which the suction in the intake manifold of the engine is employed for releasing the clutch. In one known arrangement of this kind, the clutch releasing device is placed under the control of a valve which is actuated by the accelerator pedal. When the pedal occupies its initial position the valve is open and the clutch is automatically released.

For some purposes a device is combined with this arrangement for neutralizing the connection between the pedal and the valve so that when the driver desires to dispense with the automatic clutch control he can do so by manipulating a knob or handle on the dash board of the vehicle for putting the neutralizing device into action. It is found, however, that the ordinary neutralizing device is advantageous only when the car is travelling at ordinary speeds, and may cause inconvenience if it remains in operation when the vehicle is running slowly or when the vehicle is temporarily stopped with the engine running.

The object of this invention is to provide an improved neutralizing device which obviates the disadvantages of the ordinary device, and for this purpose the invention comprises means responsive to the motion of the engine or vehicle for bringing the neutralizing device automatically to the position at which it allows the clutch to be actuated when the speed of the engine or vehicle falls below some predetermined amount.

In the accompanying sheet of explanatory drawings.

Figure 1:
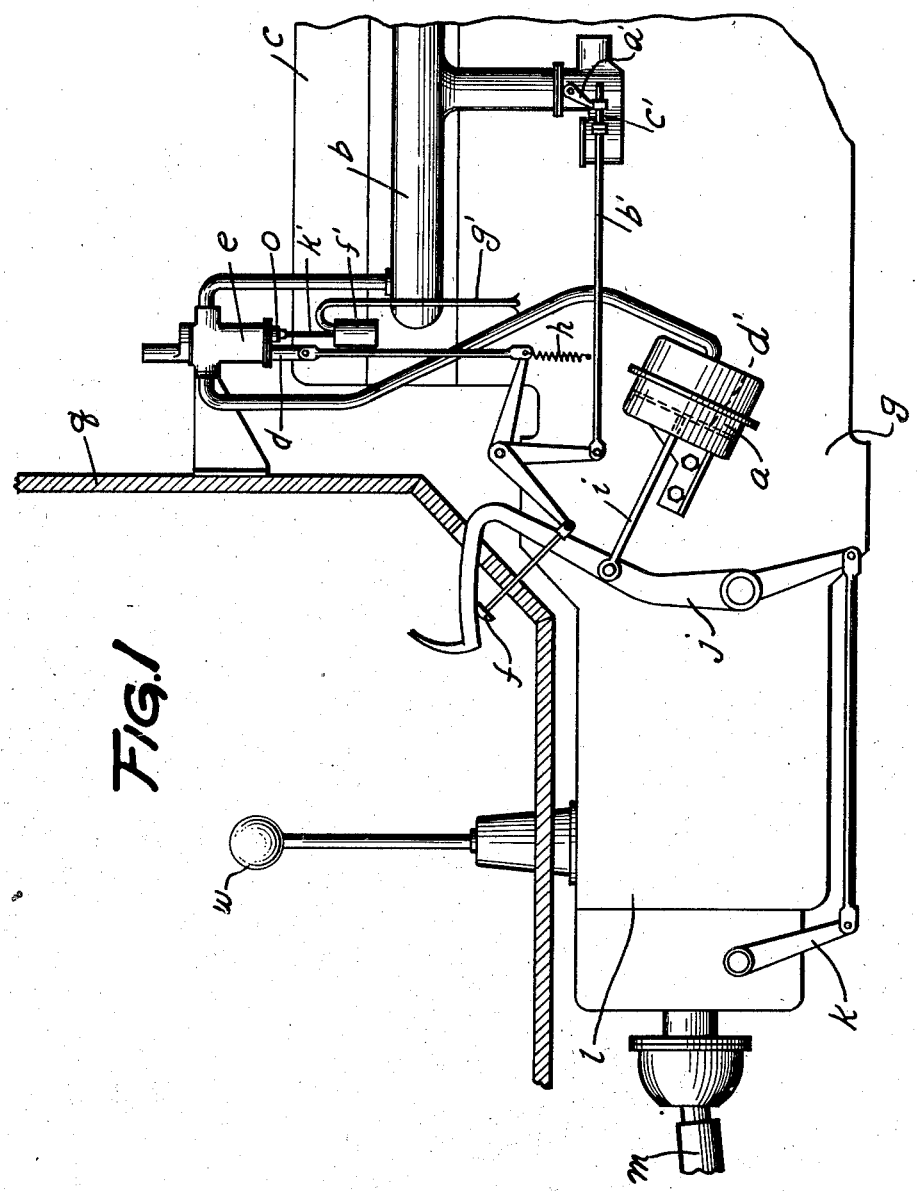
Figure 1 is a diagram illustrating a motor vehicle driving mechanism provided with this invention.

In the arrangement shown in Figure 1, the automatic clutch releasing mechanism comprises a cylinder $a$ connected to the intake manifold $b$ of the engine $c$ through the medium of a valve $d$ contained in a part $e$, the valve being actuated by the accelerator pedal $f$. The accelerator is connected with a throttle operating arm $a'$ by means of a link $b'$ and a lost motion connection $c'$. To open the valve the pedal $f$ is allowed by the driver to return to its initial position, when the valve $d$ is opened by the spring $h$, and the clutch contained in the part $g$ is automatically released, re-engagement of the clutch being effected by the conventional clutch springs (not shown) when the pedal $f$ is again depressed and the valve $d$ is closed.

A piston $d'$ in the cylinder $a$ is connected by a rod $i$ to the usual clutch pedal lever $j$ and acts on the clutch through that lever. The same lever is connected to another lever $k$ which controls a free wheel clutch situated between the variable speed gear in the box $l$ and the driven shaft $m$.

Figure 3:
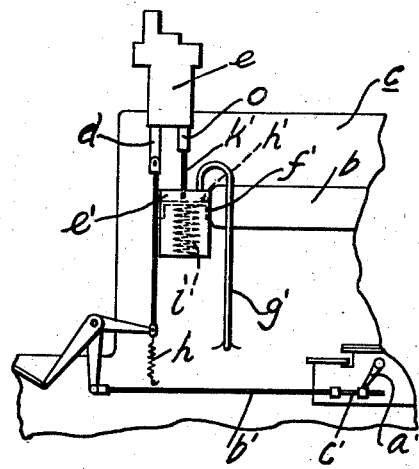
Figure 3 is a view of part of the mechanism disclosed in Figure 1, details of the cut-off valve operating motor being shown in dotted lines.
Figure 2:
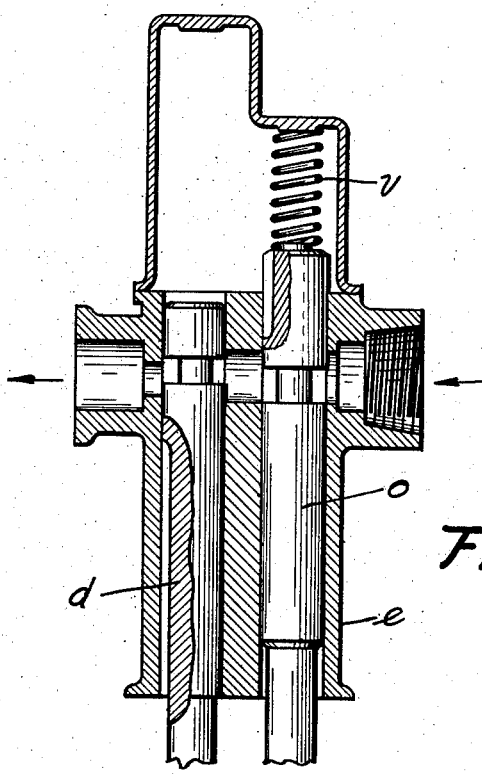
Figure 2 is a sectional elevation of the clutch controlling valve mechanism.

In an alternative arrangement, the operation of the valve $o$ may be made responsive to the pressure in the lubricating oil system of the engine. Such a mechanism is disclosed in Figure 3, wherein the chamber $e'$ of a fluid motor $f'$ is placed in fluid transmitting communication with the force feed lubricating system of the engine $c$ by means of a conduit $g'$. A reciprocable piston $h'$ of the motor $f'$ is operably connected with the cut-off valve $o$ by a connecting rod $k'$. When the speed of the engine equals or exceeds a predetermined factor, the oil pressure developed in the lubricating system is sufficient to effect a movement of the piston $h'$ against the action of a spring $l'$, and thereby permit the spring $v$ to close the valve $o$ to prevent an operation of the clutch operating mechanism. Below such critical speed of the engine the springs $l'$ and $v$ function to move the valve $o$ and thus open the valve.

In any case the valve $o$ is opened when the engine speed falls sufficiently, as for example when the vehicle is slowed down or temporarily brought to rest, and the clutch is released automatically when the accelerator pedal is released.

The invention is especially useful when the transmission mechanism of the vehicle has combined with it a free wheel clutch which is normally locked and which is only brought into action when the main clutch is released, for facilitating gear changing.

Having now particularly described and ascertained the nature of the said invention and in what manner the same is to be performed, I declare that what I claim is:

In an automotive vehicle provided with an internal-combustion engine and a clutch, a force feed mechanism for lubricating the engine, a pressure differential operated motor for operating the clutch, valve means for controlling the operation of said motor including a cut-off valve, power means for operating said cut-off including a fluid operated motor, a spring within said motor operative to place said cut-off valve in position to render the clutch operating motor operative, said power means further including another spring operative, when the fluid operated motor is energized, to place said cut-off valve in a closed position to render the clutch operating motor inoperative.

ROBERT LESLIE NEILL.